United States Patent Office 3,534,501
Patented Oct. 20, 1970

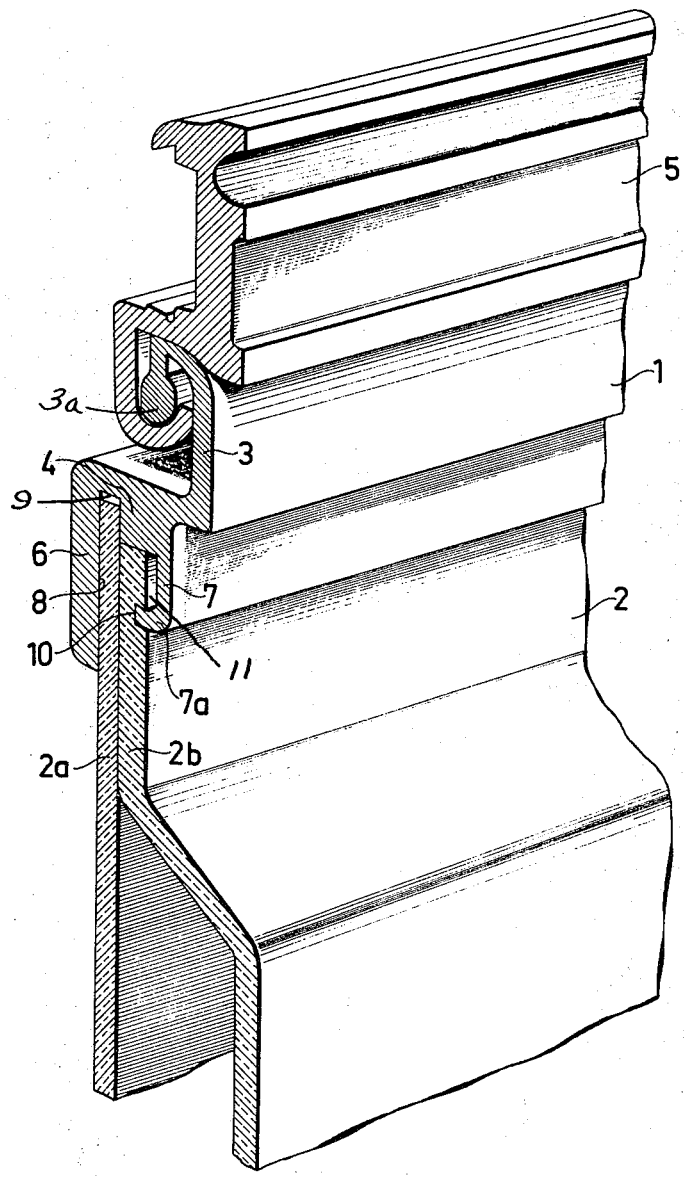

3,534,501
WINDOW MOULDING FOR PASSENGER
TRAILERS AND THE LIKE
Carl Ingvar Carlsson and Sven Erik Sandren, Tidaholm,
Sweden, assignors to Bofors-Tidaholmsverken Aktiebolag, Tidaholm, Sweden
Filed Nov. 4, 1968, Ser. No. 773,010
Claims priority, application Sweden, Nov. 13, 1967,
15,538/67
Int. Cl. E05d 7/00
U.S. Cl. 49—397                                   6 Claims

ABSTRACT OF THE DISCLOSURE

A window structure for a double-pane window of the thermally-sealed type has an outer and an inner window pane joined to each other by obliquely bending a marginal portion out of the plane of the inner pane and into abutment with the adjacent marginal portion of the outer pane with the rim of the outer pane protruding from the edge of the inner pane. The joined marginal portions of the panes are fitted in a channeled mounting frame with the outer pane abutting against the outer leg of the frame. The channeled frame has in its base a recess into which the outer pane protrudes terminating short of the bottom of the recess, the edge of the inner pane abutting against the base of the channel. The outer leg of the frame abuts against the outer pane and the inner leg is spaced apart from the inner pane and terminates in an inwardly turned flange extended into a groove in the inner pane thereby securing the window within the mounting frame while permitting expansion and contraction of the material of the panes without undue stresses.

The present invention is concerned with a window moulding for passenger or similar vehicles such as house boats and cabin boats etc. More specifically the invention is concerned with a window moulding for double-glazed windows in trailers or the like, in which said windows include two sheets of material which abut each other along their edges but which are arranged in other respects so as to leave a space between them.

Trailer windows usually comprise a window pane, preferably double-glazed, of an acrylic material and an aluminum window moulding. When constructing the window it must be borne in mind that the respective coefficients of expansion of these materials are different, so that measures must be taken to allow the materials to contract and expand in relation to one another without fracturing or deforming. Naturally, the requirements of good sealing between the aluminum moulding and the window pane should not be neglected, however.

The problem has been solved hitherto by providing an I-shaped aluminum extrusion, in the leg members of which are disposed to elongated holes or grooves, to eliminate the effect of the different coefficients of linear expansion of the materials. The window panes are anchored to the I-extrusion by means of screws or rivets, which permits a certain amount of movement in the aforementioned grooves. To facilitate these movements it is sometimes usual to mount a U-shaped rubber extrusion in the U-shaped groove between the window panes and the aluminum extrusion.

The present invention provides a novel and improved solution of the aforementioned problem, the novel solution being preferred both from the technical and the economical aspect, and obviates the use of rubber strips as construction elements.

Accordingly, the window moulding is designed so that it comprises a suspension portion and an attachment portion for the actual window, that the attachment portion has two parallel outwardly projecting leg members of which one, the outer leg, is longer than the other, the inner leg, which has an edge portion bent to form a right angle to said outer leg member and projecting outwardly towards said member, that the channel between the leg members has a right-angled recess adjacent the outer leg and that the remainder of the bottom of the channel between the recess and the inner leg member is longer than the distance by which the edge portion of said inner leg member projects into the channel. The moulding is usually made of aluminum.

The moulding is mounted to the double window pane, which usually comprises an acrylic plastic material, by simply sliding the moulding on said pane and fixing the same in the longitudinal direction of the window by means of only one securing means, positioned half way along the length of the window.

Two grooves are arranged in the flange of the window pane, of which the lower corresponds to the lower, inwardly bent edge portion of the inner leg of the aluminum extrusion, and the upper groove in said pane corresponds to the upper, inner edge portion of said inner leg.

An important factor is that the distance from the outside of the window pane to the bottom of the grooves corresponds to corresponding measurements on the aluminum extrusion. Regarding other portions of the window flange thickness tolerances can be allowed which are in excess of those acceptable with conventional U-shaped extrusions not having the aforementioned arrangements.

The portion of the combined outer and inner panes of the window which remains after the upper groove has been made therein (the outer edge of the flange) is then fitted into the aluminum extrusion so as to leave a certain gap from the bottom of the U-shaped channel.

This type of attachment enables the material to change its dimensions without deforming or fracturing. Furthermore, it enables working with normal thickness tolerances of acrylic plastic, simple or composite, and of aluminum extrusions produced in a conventional manner.

The invention will now be described in detail with reference to the accompanying drawing, the single figure of which shows a cut-away view in perspective of the window moulding according to the invention, in which a window pane is attached.

The drawing shows a window moulding 1 according to the invention, accommodating a double window pane 2. The double window comprises panes 2a and 2b, which are united along the edges thereof but which in other respects leave an insulating space therebetween. The window moulding comprises a suspension portion 3 and an attachment portion 4. The suspension portion 3 is hung in a window frame 5 as shown in the drawing, although the manner in which this is effected does not form part of the present invention. There is shown by way of example a re-entrant bead 3a hingedly held in a socket 3b.

The attachment portion 4 has two leg members, namely an outer leg 6 and an inner leg 7, the leg 7 having an edge portion 7a which is bent in towards the outer leg and forms a right angle to its perpendicular extension. The two leg members define a channel 8 which adjacent the outer leg is provided with a right-angle recess 9.

The double window 2 is passed into the channel 8 so that the outer pane 2a abuts the inner side of the outer leg 6 and projects somewhat into the recess 9, which is essentially of the same width as the outer pane; while the inner sheet 2b abuts the bottom of the channel 8 but leaves a space 11 between itself and the inner side of the inner leg 7. The edge portion 7a of said inner leg 7 is inserted into a groove 10 which is arranged in the outer side of the inner sheet 2b and which extends parallel with the edge of the sheet.

This arrangement provides a simple and very effective seal between the moulding and window pane which permits the materials to change their dimensions without deforming or fracturing.

We claim:

1. A window structure for a double-pane window of the thermally-sealed type, said window structure comprising in combination:

an outer and an inner plane window pane, one pane having a marginal portion obliquely bent out of its plane into abutment with an adjacent marginal portion of the other pane for holding the two panes in spaced apart juxtaposed relationship, the rim of said other pane protruding from the edge of said marginal portion of the bent pane; and an elongate mounting frame of generally U-shaped cross-section having an outer leg and an inner leg defining a channel therebetween, the base of the channel including a lengthwise recess of a depth greater than the length of the protruding marginal portion of said other pane and of a cross-wise width matching the thickness of said other pane, said abutting portions of the panes being received in said channel with the protruding portion of said other pane extending into said recess terminating short of the bottom thereof and the edge of said one pane facing the base of the channel.

2. The window structure according to claim 1 wherein said obliquely bent pane is the inner pane of the window, the other being the outer pane.

3. The window of structure according to claim 1 wherein the cross-wise width of the channel is greater than the combined thickness of the abutting pane portions, said protruding marginal portion of said other pane abutting against the inside of the outer leg of the frame and said marginal portion of said one pane being spaced apart from the inner leg of the frame, said inner leg terminating in an inwardly turned flange engaged with said protruding portion of said one pane.

4. The window structure according to claim 3 wherein said one pane includes a groove, said flange extending into said groove.

5. The window structure according to claim 1 and comprising an elongate suspension member swingably supporting said mounting frame.

6. The window structure according to claim 1 wherein said mounting frame is made of aluminum.

References Cited

UNITED STATES PATENTS

| 2,052,244 | 8/1936 | Pertz | 52—616 |
| 2,124,696 | 7/1938 | Hall | 49—397 X |
| 2,845,665 | 8/1958 | Place | 49—397 |
| 3,296,745 | 1/1967 | Johnson et al. | 52—623 |

FOREIGN PATENTS 195,086   1/1958   Austria.

KENNETH DOWNEY, Primary Examiner

U.S. Cl. X.R.

52—616